United States Patent [19]

Erickson

[11] Patent Number: 4,549,426

[45] Date of Patent: Oct. 29, 1985

[54] COMPACT FLOW PROVER

[75] Inventor: Charles D. Erickson, Houston, Tex.

[73] Assignee: Smith Meter, Inc., Houston, Tex.

[21] Appl. No.: 641,029

[22] Filed: Aug. 15, 1984

Related U.S. Application Data

[63] Continuation-in-part of Ser. No. 546,568, Oct. 28, 1983.

[51] Int. Cl.⁴ ............................................. G01F 25/00
[52] U.S. Cl. ............................................. 73/3; 73/46
[58] Field of Search ....................................... 73/3, 46

[56] References Cited

U.S. PATENT DOCUMENTS

| | | |
|---|---|---|
| 1,586,834 | 6/1926 | Ormsby . |
| 2,652,953 | 9/1953 | Gray . |
| 2,838,140 | 6/1958 | Rasmusson et al. . |
| 2,892,346 | 6/1959 | Sargent . |
| 2,948,142 | 8/1960 | Zimmerman . |
| 2,948,143 | 8/1960 | Pruitt . |
| 2,991,645 | 7/1961 | Lauderdale ............................ 73/3 |
| 3,021,703 | 2/1962 | Pfrehm . |
| 3,098,382 | 7/1963 | Hoffman et al. . |
| 3,273,375 | 9/1966 | Howe . |
| 3,423,988 | 1/1969 | Grove et al. . |
| 3,492,856 | 2/1970 | Francisco . |
| 3,530,705 | 9/1970 | Lathrop . |
| 3,580,045 | 5/1971 | Pfrehm . |
| 3,668,923 | 6/1972 | Grove et al. . |
| 3,969,924 | 7/1976 | Grove ...................................... 73/46 |
| 4,096,747 | 6/1978 | Gilson . |
| 4,152,922 | 5/1979 | Francisco . |
| 4,372,147 | 2/1983 | Waugh et al. . |
| 4,481,805 | 11/1984 | Dobesh .................................. 73/3 |

FOREIGN PATENT DOCUMENTS

WO83/02825 8/1983 PCT Int'l Appl. ...................... 73/3
1038287 8/1966 United Kingdom ...................... 73/3
2088566 6/1982 United Kingdom .
566140 9/1977 U.S.S.R. .

Primary Examiner—S. Clement Swisher
Attorney, Agent, or Firm—Arnold, White & Durkee

[57] ABSTRACT

A compact flow prover for calibrating continuous flowmeters includes a measuring housing comprising a main cylinder having a substantially uniform inside diameter and inlet and downstream sections having inside diameters greater than the main cylinder. The compact flow prover is provided with a displacer movably disposed within the housing having seals which form a fluid barrier while the displacer is disposed within the main cylinder. Inlet and downstream section guide means are provided to maintain the displacer in axial alignment with the main cylinder while the displacer is disposed within either of these sections, assuring smooth exit and entry. The displacer is provided with seals which are circumferentially compressed when the displacer enters the main cylinder and may be statically or dynamically monitored for integrity without an external pressure source. Means for returning the displacer from the downstream section to the inlet section following a proving cycle and means for detecting the longitudinal disposition of the displacer during a proving cycle are provided. The flow prover also includes an inlet conduit, an outlet conduit, and a valved bypass conduit fluidly connecting the inlet and outlet conduits. The displacer may be positioned within the cylinder by a member extending from the displacer into an external enclosure. The fluid pressure within the enclosure may be regulated to control the position of the displacer and to equalize unbalanced forces across the displacer.

28 Claims, 16 Drawing Figures

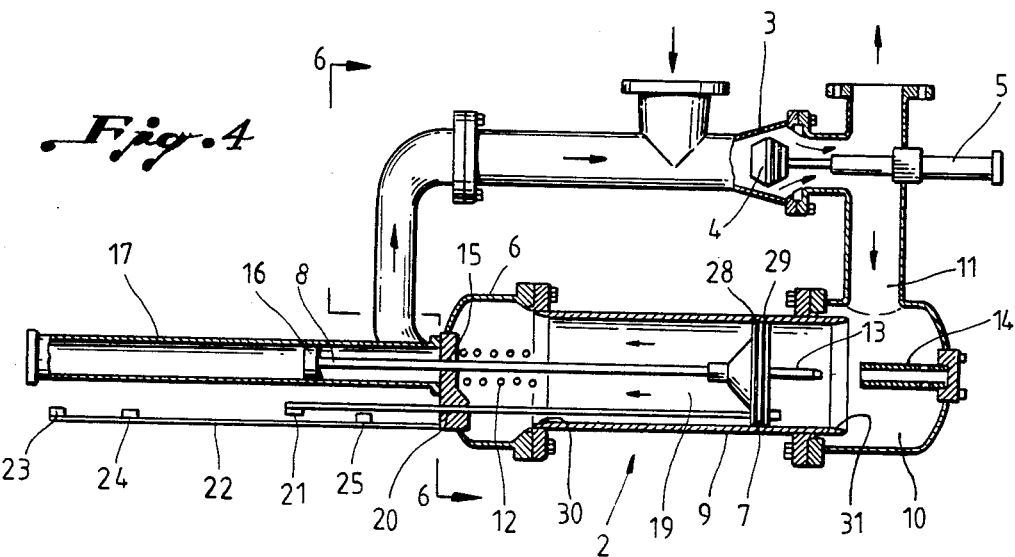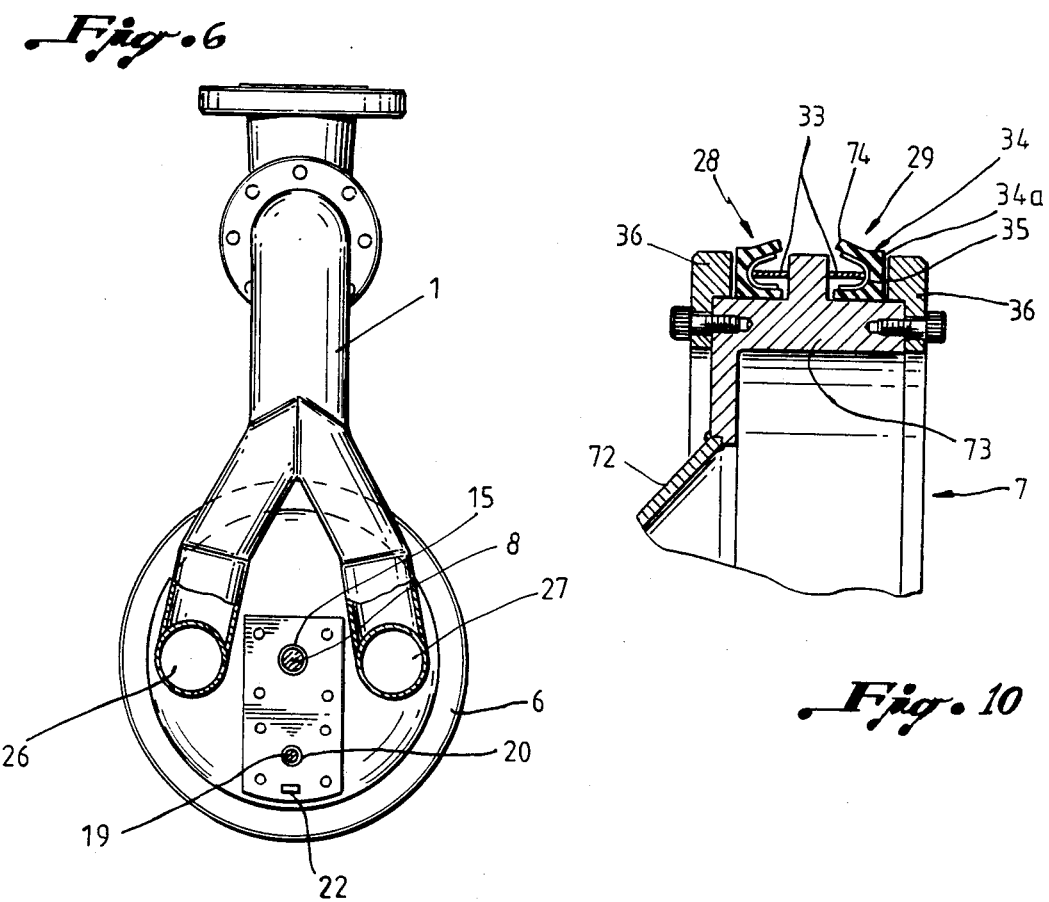

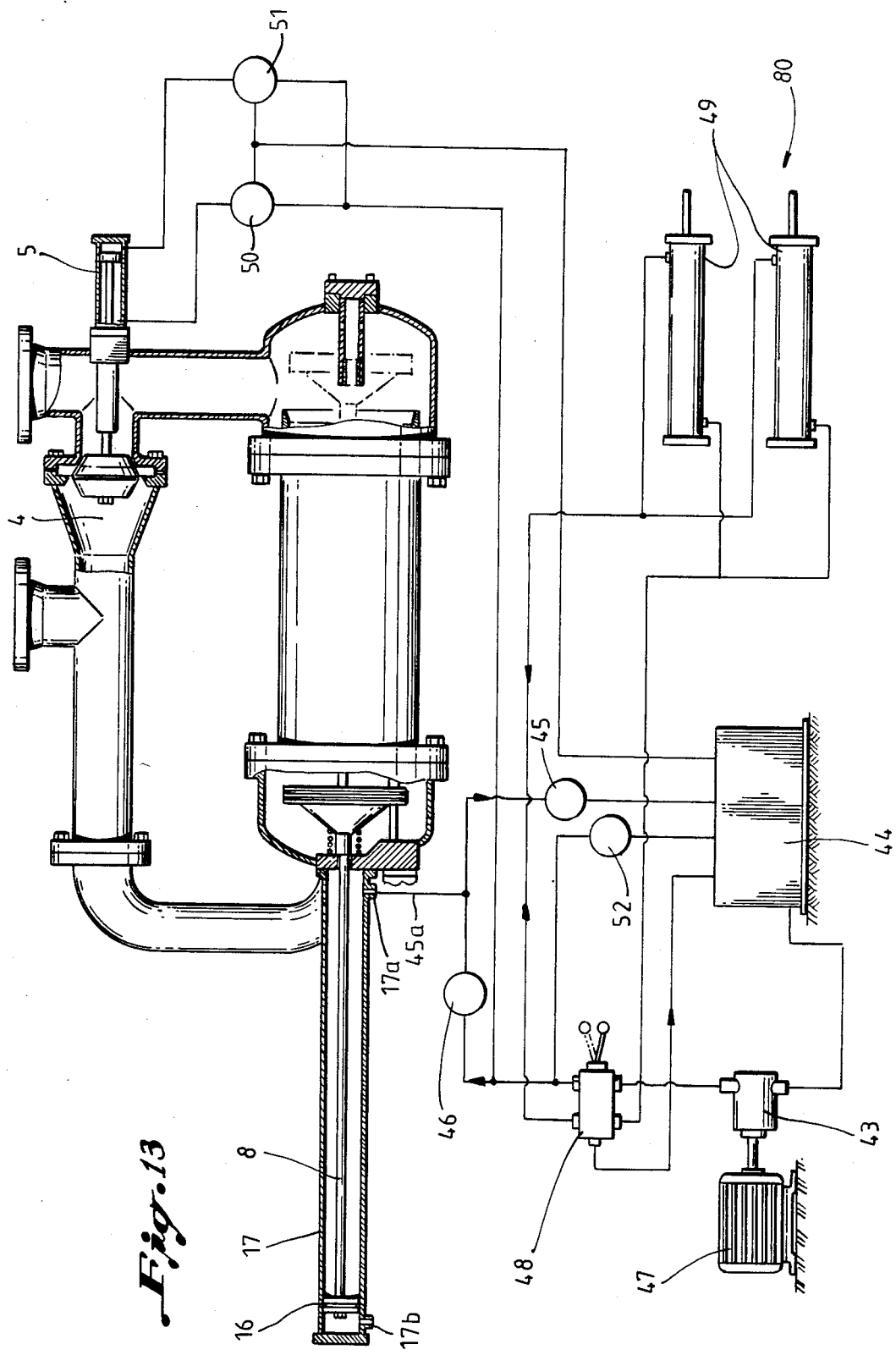

COMPACT FLOW PROVER

CROSS REFERENCE TO RELATED APPLICATIONS

This is a continuation-in-part of prior application Ser. No. 546,568, filed Oct. 28, 1983. This application is also related to co-pending application filed simultaneously herewith and having common assignee, entitled "Flow Prover With Seal Monitor", inventors Helmut W. Hopfe and Hershel Roberson.

BACKGROUND OF THE INVENTION

This invention pertains to the volumetric measurement of flow and, particularly, a compact flow prover useful in periodically calibrating a continuous flowmeter in a pipeline without interrupting the flow of fluid therethrough. The compact flow prover of this invention falls generally into that class of flow provers characterized by the measurement of the movement of a piston traveling through a cylinder. This invention pertains specifically to a compact flow prover having the improved qualities of accuracy, dependability, infrequent and simplified maintenance, simple and light weight construction, low space requirements, and operating flexibility.

One type of device commonly employed for determining the accuracy of a continuous flowmeter is known as a calibrating loop. This device typically comprises a long run of pipe through which a free moving plug or sphere is propelled by the fluid moving therethrough. By measuring the time that it takes the object to move from one detector switch to another, the rate of fluid flowing through the flow loop can be determined. This type of device is the subject matter of U.S. Pat. No. 2,948,142 to Zimmerman, U.S. Pat. No. 2,948,143 to Pruitt, U.S. Pat. Nos. 3,423,988 and 3,668,923 to Grove, and U.S. Pat. No. 3,530,705 to Lathrop. Calibrating loops generally require a substantial length to maintain a usable accuracy. The high cost of these devices prevents their use in all but the most critical situations.

The use of positive displacement piston-type flowmeters is well documented. Examples of this type of flowmeter which are not particularly suited for calibration purposes include U.S. Pat. No. 1,586,834 to Ormsby, U.S. Pat. No. 2,652,953 to Gray, U.S. Pat. No. 2,892,346 to Sargent, and U.S. Pat. No. 4,096,747 to Gilson.

An example of a positive displacement piston-type flow prover useful in calibrating flowmeters is seen in U.S. Pat. No. 3,021,703 to Pfrehm which discloses a bidirectional, free-moving piston in a calibration barrel. The movement of the piston is detected by two detector switches which are mechanical in nature, located toward either end of the calibrating barrel. In order to obtain usable accuracy, a considerable run of pipe is required. For example, if the accuracy of the detector switch is ±0.05 inches, a run of pipe of 42 feet or more is required to yield desired accuracy of ±0.02%. In addition, since the detector switch protrudes into the calibrating barrel and the outlet ports are connected to the calibrating barrel, the piston seals will be subject to wear each time they pass the switches and the outlet ports. Because valves must be opened and closed simultaneously, further inaccuracies may be introduced into the measurement and serious disruption of flow may occur.

A device similar to U.S. Pat. No. 3,021,703 is disclosed in U.S. Pat. No. 3,580,045, also to Pfrehm. The device differs from U.S. Pat. No. 3,021,703 in that the mechanical detector switches are replaced with external proximity switches which detect the passage of a steel band on the piston. The use of a four way spool valve which reduces the complexity of the valving arrangement is also disclosed. However, it is believed that the seals of this valve are subject to wear and leakage and are not amenable to monitoring of seal integrity.

U.S. Pat. No. 3,273,375 to Howe discloses another type of flow prover comprised of inner and outer tubular members and a free-moving piston located in the inner tubular member. This arrangement allows for a simpler valving system and eliminates the need for pressure correction. However, the device uses the same external proximity switches discussed above and it is believed that the piston seal life is not greatly improved because the piston must move past outlet ports. In addition, special arresting means are required to stop the movement of the piston at either end of the calibrating barrel. Moreover, it is believed the complicated construction makes assembly and maintenance difficult.

U.S. Pat. Nos. 3,492,856 and 4,152,922, both to Francisco, disclose flow provers in which outlet ports on the calibrating barrel are not necessary. These devices utilize a flow-through piston having a poppet valve in the piston which may be closed during the proving cycle. The poppet valve requires pressuring means such as gas to close the poppet valve at the beginning of the proving cycle. U.S. Pat. No. 3,492,856 discloses external proximity switches located on the calibration barrel and retrieves the piston at the end of the proving cycle by means of a cable and drum.

U.S. Pat. No. 4,152,922 discloses a piston retracting means comprised of a rod connected to a measuring piston which has at its other end a retracting piston located in a hydraulic cylinder. The movement of the measuring piston is detected by proximity switches which detect the movement of the retracting piston in the hydraulic cylinder. In this prover, the measuring piston seals may be damaged by the presence of entrained solids such as grit or sand which may be in the measured fluid and become trapped between the calibrating barrel and the piston seals. If this prover is operated in a horizontal position the situation is aggravated since the solid particles may settle along the bottom of the cylinder.

A further problem associated with the flow provers heretofore mentioned is that horizontal operation results in reduced piston seal life along the bottom of the piston because of the weight of the piston.

It is a feature of this invention to provide a compact flow prover which does not have the disadvantages associated with the devices heretofore known. A further feature is to provide a compact flow prover with improved accuracy and dependability, reduced space and weight requirements, simplified construction and maintenance, and operating flexibility. Still another feature is to provide a compact flow prover with the aforementioned features which is operable at high pressures. These and other features will be apparent to those skilled in the art in the following description of the invention.

SUMMARY OF THE INVENTION

The compact flow prover of this invention determines the rate of flow by measuring the time in which a displacer traveling through a cylinder displaces a known volume of fluid.

The compact flow prover of this invention comprises a measuring housing, a displacer moveably disposed along the axis of the measuring housing, and means for detecting the longitudinal disposition of the displacer in the measuring housing. The housing defines three distinct sections including a hollow main cylinder with inlet and downstream sections attached at either end. The main cylinder has a substantially uniform inside diameter. The displacer is provided with seals along its periphery which form a fluid barrier while the displacer is disposed within the main cylinder. The cross-sectional area in the inlet and downstream sections is larger than that of the main cylinder so that fluid may flow past the displacer when it is disposed within either of these sections. Guide means are provided in the inlet and downstream sections of the housing for maintaining the displacer in axial alignment with the main cylinder when it is disposed within either of these sections. Means are provided for encouraging the displacer to enter the main cylinder from the inlet section at the start of a proving cycle. Means are also provided for returning the displacer from the downstream section to the inlet section at the end of a proving cycle.

Operation of the compact flow prover of this invention is simple. With the displacer held in the inlet section by the return means, flow of the fluid to be measured is initiated into the inlet section and through the main cylinder and downstream section. After the return means are released, the encouraging means, and the flow of fluid through the inlet section cause the displacer to move toward the main cylinder. The inlet section guide means ensure a smooth entry of the displacer into the main cylinder by maintaining the displacer in axial alignment with the main cylinder. Once it enters the main cylinder, the displacer is propelled therethrough by the flow of the measured fluid.

As the displacer moves through the main cylinder, the time required for it to move a predetermined longitudinal distance corresponding to a known volume is measured and may be used to calculate the rate of fluid flow. The downstream section guide means maintain the displacer in axial alignment with the main cylinder as it exits therefrom and enters the downstream section. The flow of fluid through the housing is bypassed and the return means are used to bring the displacer from the downstream section, through the main cylinder and into its launch position in the inlet section. The compact flow prover is then ready to begin another proving cycle.

An advantage of the compact flow prover of this invention is that the flow of fluid past the displacer while it is disposed within the inlet and downstream sections provides a cleansing of the displacer seals which tends to remove any solid material which may be deposited therein. This cleansing extends the useful life of the displacer seals. Another advantage is that fluid flows through the entire cross-section of the main cylinder along its entire length so that no dead spots develop which would tend to allow suspended particles to settle, especially when the prover is operated in the horizontal position. Still another advantage is that the displacer may be of light weight construction resulting in less wear on the displacer seals and the interior surface of the main cylinder. The single barrel construction also facilitates assembly and maintenance accessibility.

In a specific implementation of the compact flow prover of this invention, fluid is introduced into the inlet section of the measuring housing by means of an inlet conduit. The fluid leaves the measuring housing through an outlet conduit in communication with the downstream section of the measuring housing. Means for bypassing the measuring housing are provided which include a valved bypass conduit connected to the inlet and outlet conduits. In a preferred implementation, an improved bypass valve is provided which has a simple construction and operation. Since the bypass valve does not have to anticipate differential pressure across the valve equal to the rated internal pressure of the flow prover, the valve can have a simple poppet construction rated for considerably lower pressure, thus offering an economical advantage over conventional valves. The improved bypass valve provided also has the advantage of enabling monitoring of its seal integrity without an external pressure source.

In another implementation, the displacer return means comprise a hydraulic cylinder and piston. The hydraulic piston is connected to the displacer by a rod or shaft extending through the housing in axial alignment with the main cylinder. Following the proving cycle, the displacer is returned to its launching position by introducing hydraulic fluid under pressure into the hydraulic cylinder. Guide means include the rod connecting the displacer to the hydraulic piston and a journal bearing located in the wall of the housing which slidably engages the rod.

In another implementation, the displacer return means comprise a hydraulic pressure vessel and ram. The ram is connected to the displacer so that by varying the pressure within the vessel, the displacer can be positioned as desired.

Another implementation provides an encouraging means comprising a compression spring in the inlet section of the housing. The spring encourages the displacer to enter the main cylinder when the return means is released, thus eliminating the need for a pressurized gas or hydraulic fluid to encourage the displacer at the beginning of the proving cycle. According to another a specific implementation, differential pressure forces acting on the displacer provide additional means of encouraging the displacer to enter the main cylinder. These differential pressure forces result from the differences in effective area between the upstream and downstream faces of the displacer upon which the fluid pressure is exerted.

Another implementation provides a guide means comprising a displacer pilot extending from a face of the displacer and an axial sleeve bearing located in the downstream or inlet sections as appropriate. The axial sleeve bearing and the pilot are in axial alignment with the main cylinder and the sleeve slidably engages the pilot. These guide means maintain the displacer in axial alignment allowing smooth entry and exit of the displacer.

In another implementation, the detecting means comprise a rod connected to the displacer, a journal bearing located in the wall of the housing slidably engaging the rod, a detector flag positioned at the other end of the rod, and a plurality of detector switches which detect the passage of the detector flag and simultaneously provide a signal. Since the detector flag and detector switches are located outside the housing, extremely precise optical detector switches or magnetic detector switches may be used. Another advantage of external placement of the detecting means is that maintenance and calibration of the compact flow prover are greatly facilitated. Still another advantage is that the detecting means may be made insensitive to temperature variations of the flowing fluid, eliminating the need for correction of the distance between the detector switches due to thermal expansion.

In another implementation, the main cylinder is chamfered at either end and the displacer is provided with a plurality of compressible seals. As the displacer enters the main cylinder, the seals are circumferentially compressed. The fluid trapped in the annular space formed between the seals is also compressed. If the seals are functioning properly, the pressure of the fluid trapped between the seals will be higher than the fluid in the main cylinder and this pressure differential will not dissipate until the displacer exits the main cylinder. Thus, by comparing the pressure in the annular space with the line pressure, the integrity of the displacer seals may be verified. Means are provided for verifying the integrity of the displacer seals statically and while the displacer is in the proving mode. Thus, the integrity of the displacer seals may be verified without removing the prover from operation. Since the integrity of the prover seals is quickly ascertained, error introduced by leakage of fluid past the seals is easily eliminated.

In another implementation, the compact flow prover is operated in a vertical position and is provided with pliable, spring loaded displacer seals. This specific implementation is capable of handling very dirty fluids such as crude oil.

In another implementation, the compact flow prover is operated in a horizontal position and is provided with less pliable displacer seals which are capable of supporting the weight of the displacer. This specific implementation provides a seal which is capable of handling low lubricity fluids. The flow prover may be mounted to enable it to be selectively positioned in either a horizontal or vertical orientation.

Optionally, means are provided for monitoring the integrity of the seals of the detector rod and displacer rod.

A control system is optionally provided to simplify the providing sequence. The use of permissive actions minimizes and identifies problems with the prover. For example, the displacer cannot be launched unless it is in the launch position and the bypass valve closed with positive seal integrity. After the displacer is at the end of its stroke, the bypass valve may be opened after a predetermined time delay. Once the valve is opened, the displacer is returned to the launch position. The bypass valve is closed when the displacer exits the upstream end of the cylinder.

The compact flow prover may be used to calibrate a continuous flowmeter connected in series with the flow prover. The accuracy of the continuous flowmeter is determined by comparing electrical pulses therefrom with high frequency electrical pulses generated by the flow proving system as the displacer moves a predetermined distance within the main cylinder. The volume of fluid displaced thereby may be corrected for temperature and pressure expansion of the cylinder.

BRIEF DESCRIPTION OF THE DRAWINGS

FIG. 4 is a side sectional view of the compact flow prover in the displacer return mode.

FIG. 6 is an end view taken generally along the lines of 6—6 in FIGS. 1-4.

FIG. 10 is a partial cross-sectional view of one embodiment of the displacer seals shown in FIG. 8.

FIG. 13 is a block diagram of a suitable hydraulic system for operating the present invention.

DESCRIPTION OF THE SPECIFIC IMPLEMENTATIONS

Figure 1:
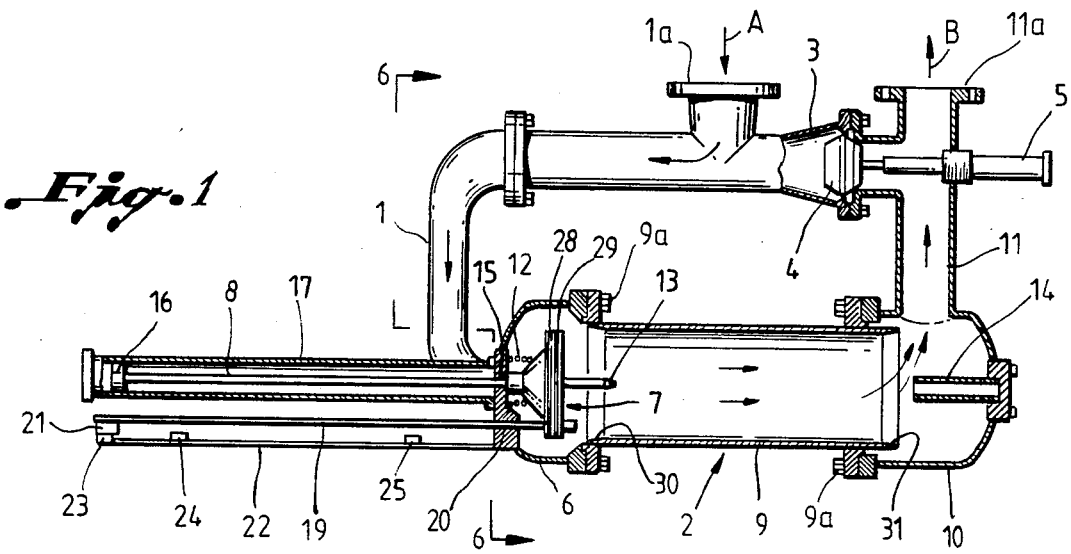
FIG. 1 is a side sectional view of the compact flow prover in the launch position.

The compact flow prover shown in FIGS. 1-4, includes inlet conduit 1, outlet conduit 11 in fluid communication with housing 2, and bypass conduit 3. Liquid enters via the port 1a to inlet conduit 1, as indicated by the arrow A in FIG. 1, and exits from the outlet conduit 11, via the port 11a, as indicated by the arrow B in FIG. 1. The normally closed bypass valve 4 is located in bypass conduit 3 and is operated by bypass valve actuator 5.

Housing 2 includes inlet section 6, main cylinder 9, and downstream section 10, all in axial alignment. The sections 6 and 10 may be disconnected from the cylinder 9 by way of bolts 9a. Inlet section 6 is in fluid communication with inlet conduit 1 and main cylinder 9. Downstream section 10 is in fluid communication with main cylinder 9 and outlet conduit 11. The inside diameter of main cylinder 9 is substantially uniform. The cross sectional areas of the inlet section 6 and downstream section 10 are larger than the cross sectional area of main cylinder 9.

Displacer 7 is shown movably disposed within housing 2. Displacer seals 28, 29 are positioned on the periphery of displacer 7. Shaft 8 is connected to the center of the downstream face of displacer 7. Shaft 8 extends through journal bearing 15 in inlet section 6 and is connected to hydraulic piston 16 which is slidably disposed in hydraulic cylinder 17, as shown in FIGS. 1 and 6.

Detector rod 19 is connected to displacer 7 and extends from inlet section 6 through journal bearing 20. At its downstream end, detector rod 19 is provided with detector flag 21. Detector unit 22 is provided with spaced apart precision detectors 23, 24 and 25 to detect the passage of detector flag 21. The detectors can be optical detectors, such as photomicrosensors, Model EESH3M, available from OMRON, magnetic detectors, or linear transducers.

The downstream section guide means 10a are comprised of displacer pilot 13, extending from the center of the upstream face of displacer 7, and axial sleeve bearing 14, located in downstream section 10 and concentric with displacer pilot 13. Compression spring 12 encircles axial shaft 8 in section 6 to aid in encouraging displacer 7 to enter main cylinder 9 during the launch mode.

Figure 5:
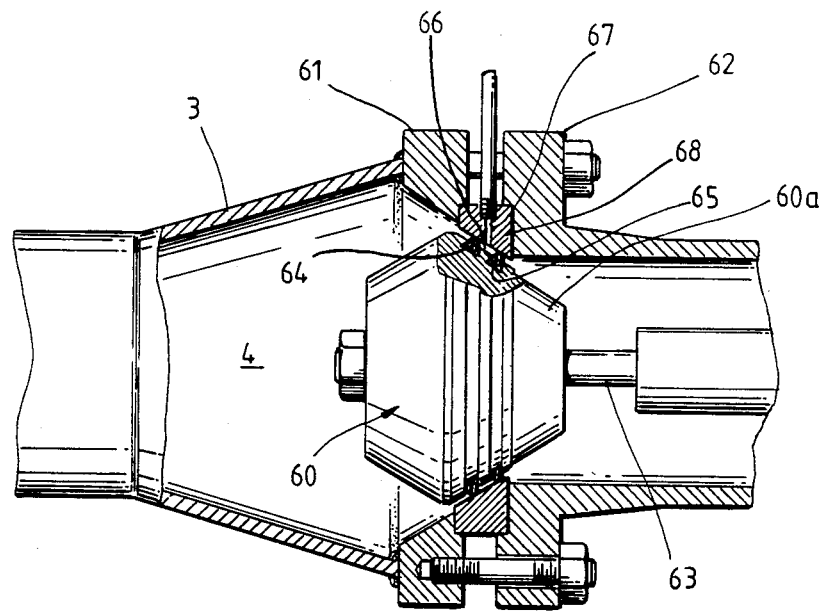
FIG. 5 is an enlarged vertical cross-sectional view of the bypass valve shown in FIG. 1.
Figure 9:
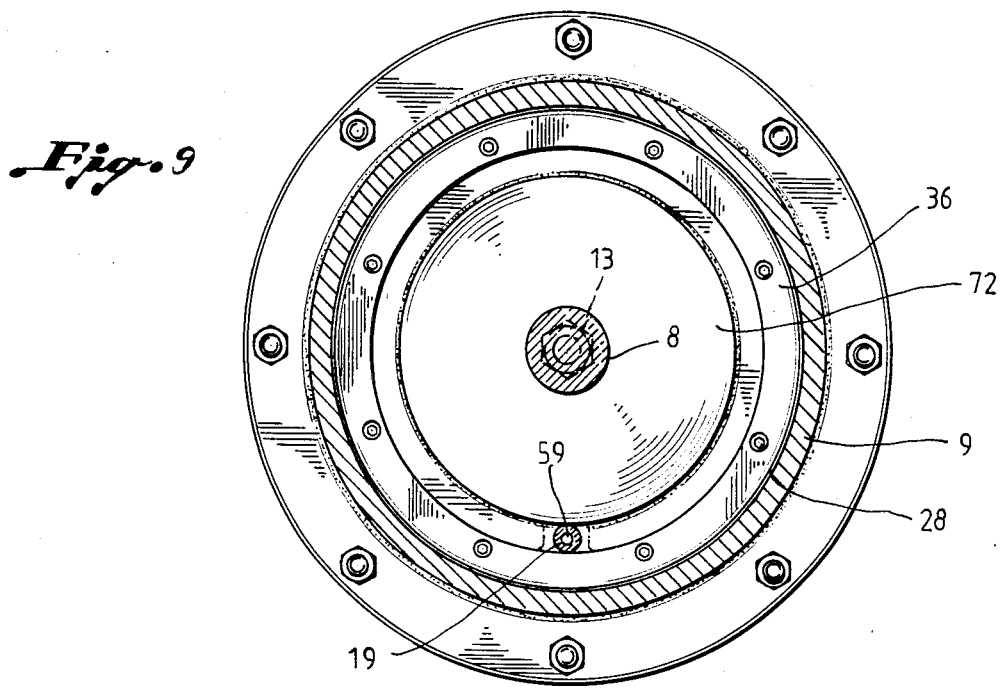
FIG. 9 is a sectional view of an implementation of the displacer as seen in FIG. 8 along the lines 9—9.

In the specific implementation shown in FIG. 5, bypass valve 4 is of a simple poppet design with the poppet 60 having a conical frustum 60a connected to actuator stem 63. Poppet 60 abuts valve seat 68 positioned between upstream flange 61 and downstream flange 62 of conduit 3. Poppet 60 is provided with seals 64 and 65. Annular space 66 between seals 64 and 65 is in fluid communication with channel 67 formed in valve seat 68. Channel 67 may be connected to a pressure transducer or element 54.

The shaft 8 is slidably engaged by journal bearing 15 and detector rod 19 is slidably engaged by journal bearing 20, as shown in FIG. 6. Inlet conduit 1 is bifurcated to allow fluid to enter inlet section 6 through fluid inlet ports 26 and 27. This arrangement allows fluid to enter inlet section 6 in a substantially longitudinal direction, reducing or eliminating radial and angular forces on displacer 7 and further permitting shaft 8 to have a reduced diameter and weight. Monitoring means (not shown) may be provided for monitoring the intergrity of the seals (not shown) in journal bearings 15 and 20.

Figure 7:
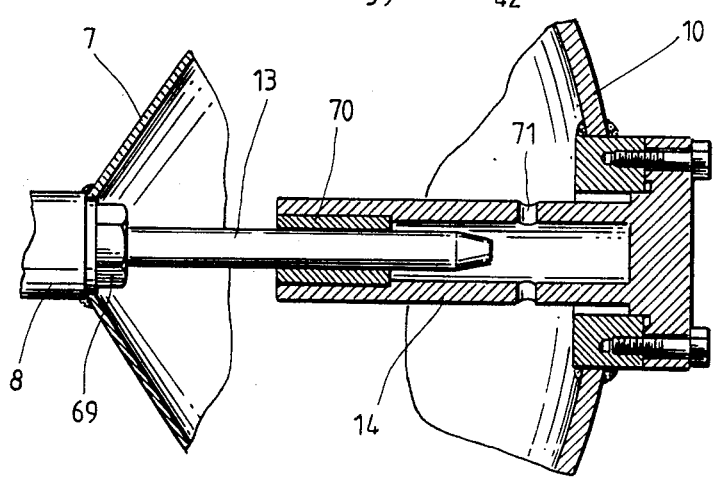
FIG. 7 is an enlarged, partial cross-sectional view of the downstream section guide means shown in FIG. 1.

As shown in FIG. 7, displacer pilot 13 is secured to displacer 7 by means of nut 69; however, displacer pilot 13 and shaft 8 may also be of unitary construction. Displacer pilot 13 is slidably engaged by bushing 70 in axial sleeve bearing 14. Axial sleeve bearing 14 and displacer pilot 13 are in axial alignment with main cylinder 9. Axial sleeve bearing 14 is provided with channel 71 to allow fluid to escape from axial sleeve bearing 14 as displacer pilot 13 extends into the bearing 14. This displacement of fluid from axial sleeve bearing 14 provides a gentle arresting mechanism to slow the movement of displacer 7 as it enters downstream section 10.

Figure 8:
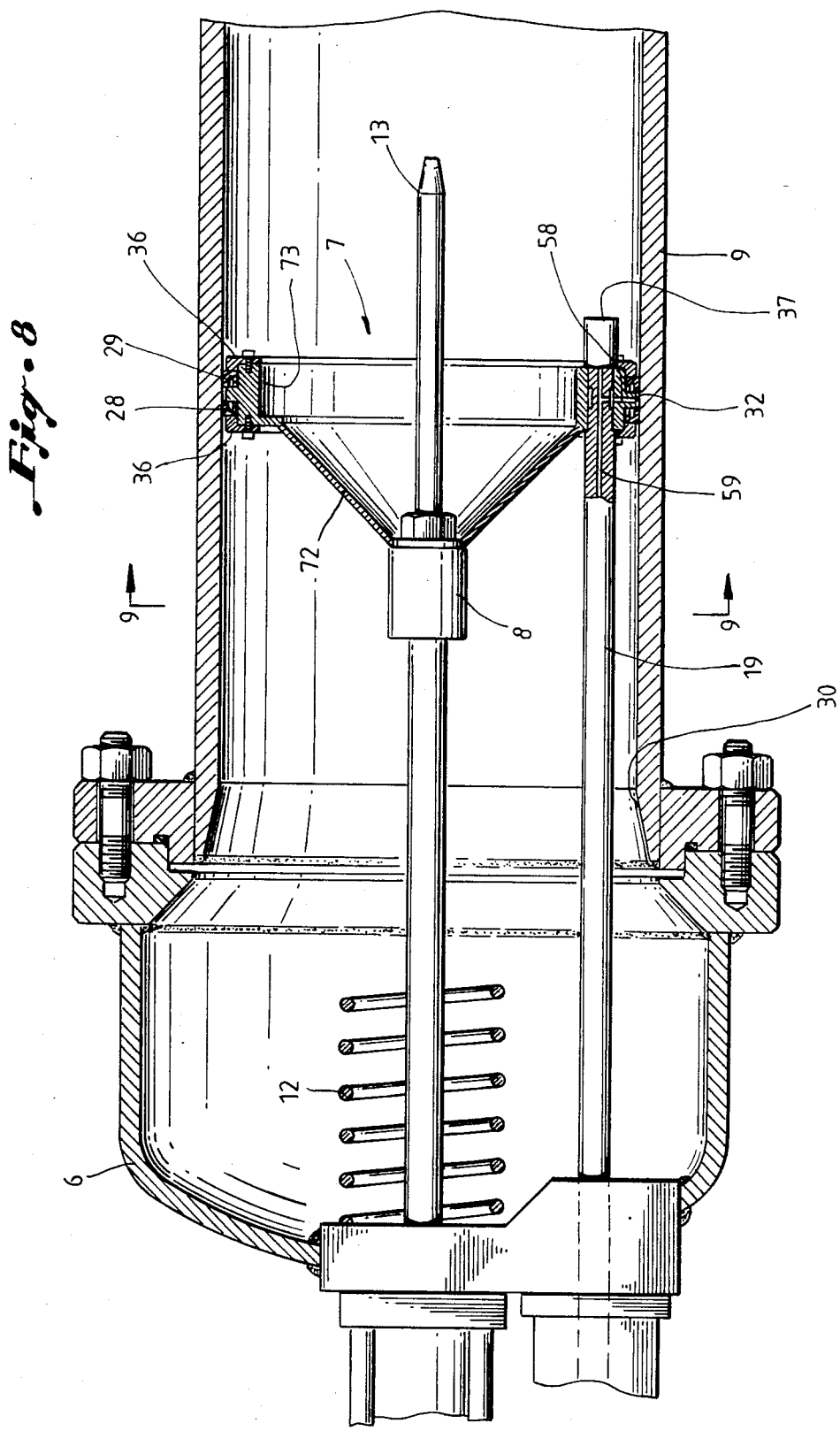
FIG. 8 is an enlarged vertical cross-sectional view of the displacer shown in FIG. 4.

Main cylinder 9, shown in FIG. 8, is chamfered at either end to facilitate the smooth entry of displacer 7. For example, a 4° chamfer of 2 inches gives suitable results with a 12.750 inch inside diameter cylinder. The interior surface of main cylinder 9 is plated with a corrosion resistant material and honed smooth. Main cylinder 9 advantageously has a substantially uniform inside diameter to provide accurate measurement and provide long displacer seal life. For example, it has been found that a 12.750 inch±0.001 inside diameter cylinder, with a 0.005 inch hard chrome plate and a 12 Root Mean Square (RMS) or better finish, gives suitable results. The particular diameter and length of the cylinder are chosen based on the flow rates to be measured and the accuracy required.

Displacer 7 is comprised of conical portion 72 and ring portion 73. It is readily appreciated that other shapes are possible for the displacer. Seals 28 and 29 are prevented from slipping off displacer by retaining rings 36. Annular space 32 formed between seals 28 and 29 is in fluid communication with channel 58 in the displacer 7. Volume compensator 37 is provided in fluid communication with channel 58, by a channel detector rod 19 to prevent excessive pressure in annular space 32.

As shown in FIG. 10, displacer seals 28 and 29 each include a sideways oriented, u-shaped resilient member 34, having a base 34a and a u-shaped metallic energizer 35 wrapped within the member 34. The material of outer layer 34 may be any material typically used for seals such as polytetrafluoroetheylene or polybutylene and is selected based on the chemical resistance of the material to the fluid being measured, the lubricity of the fluid, and horizontal or vertical orientation of the compact flow prover in operation. The material of energizer 35 is preferably a metallic alloy. The seals are prevented from slipping off of displacer 7 by threadedly connected, removable retaining rings 36 and held in place by bands 33 which may be made of steel or aluminum. As shown in FIG. 10, base portion 34a of seals 28 and 29 may extend radially otwardly beyond rings 36. The inwardly facing lip 74 of each member 34 is pressed outwardly by metallic energizer 35.

Figure 11:
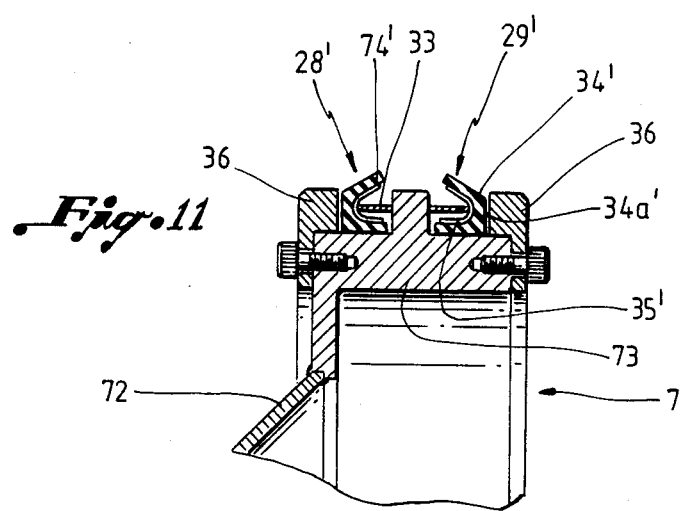
FIG. 11 is a partial cross-sectional view of another embodiment of the displacer seals.

FIG. 11 shows an alternate implementation of displacer seals 28' and 29'. Base portion 34a' is shown not extending radially outwardly beyond rings 36. However, lip 74' is pressed out beyond rings 36 by metallic energizer 35'.

Volume compensator 37 may include housing 38, inner cup-shaped element 39, outer cup-shaped element 41, concentrically arranged about the element 50, compression spring 40, and seal 42. Inner element 39 is slidably engaged by seal 42. The chamber formed between inner element 39 and outer element 41 is in fluid communication with the exterior of the volume compensator 37.

A hydraulic system 80 for implementing this invention, shown in FIG. 13, may comprise a hydraulic pump 43 driven by motor 47, lift selector valve 48 that operates lift actuators 49, and reservoir 44. The supply and return of hydraulic fluid to hydraulic cylinder 17 via the port 17a and line 45a is controlled by a displacer release solenoid 45 and displacer return solenoid 46. Similarly, bypass valve actuator 5 may be controlled by means of bypass close solenoid 50 and bypass open solenoid 51. The hydraulic system 80 is protected from overpressure by means of relief valve 52, and vacuum lock is prevented by port 17b.

Figure 14:
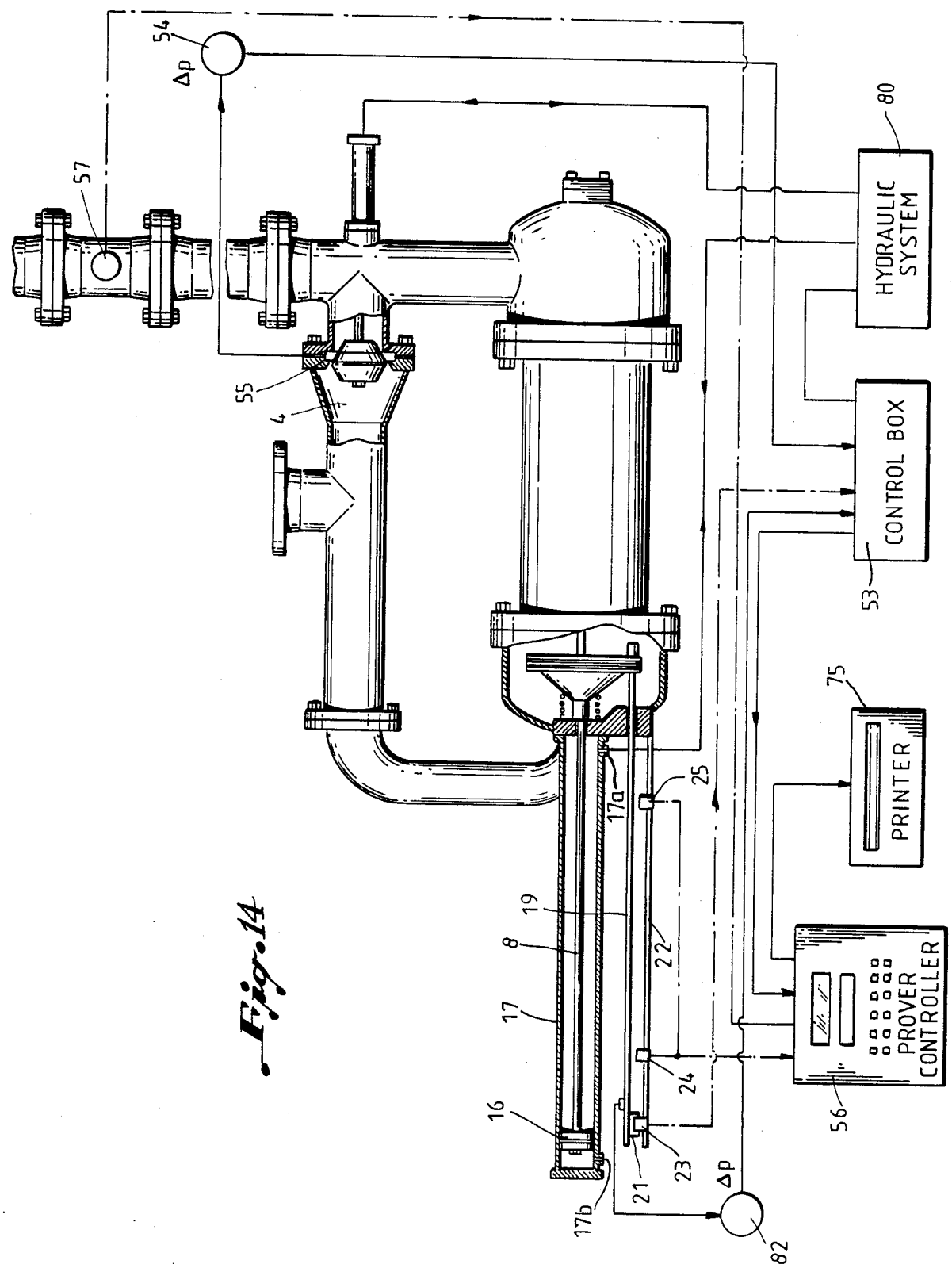
FIG. 14 shows a block diagram of one embodiment of a control system useful with the present invention.

Circuitry for controlling the flow prover, shown in FIG. 14, comprises control box 53, prover controller 56, and printer 75. Control box 53 is electrically connected to detector 23, any seal monitoring means which are provided, prover controller 56, and the hydraulic system 80. Prover controller 56 is electronically connected to detectors 24 and 25, continuous flow meter 57 and printer 75.

The operation of the compact flow prover, shown in FIGS. 1-14 may be as follows, best described by reference to FIGS. 1-4. The flow of fluid through the compact flow prover in the launching mode is shown by solid arrows in FIG. 1. The fluid enters inlet conduit 1 and flows into housing 2. Fluid is prevented from flowing through bypass conduit 3 during the proving cycle by the normally closed bypass valve 4. Fluid enters inlet section 6 of housing 2, flows through main cylinder 9, and exits housing 2 through outlet conduit 11.

Figure 2:
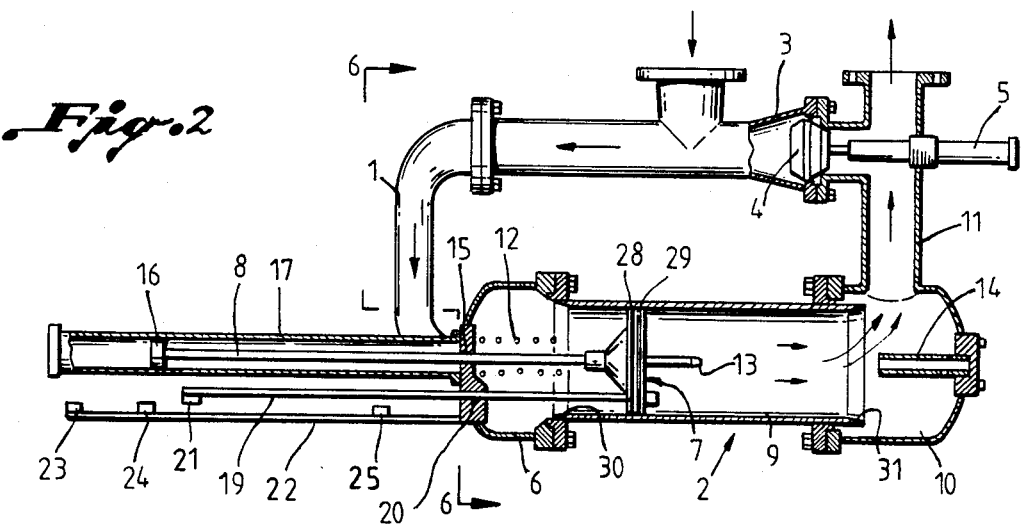
FIG. 2 is a side sectional view of the compact flow prover in the proving cycle.
Figure 3:
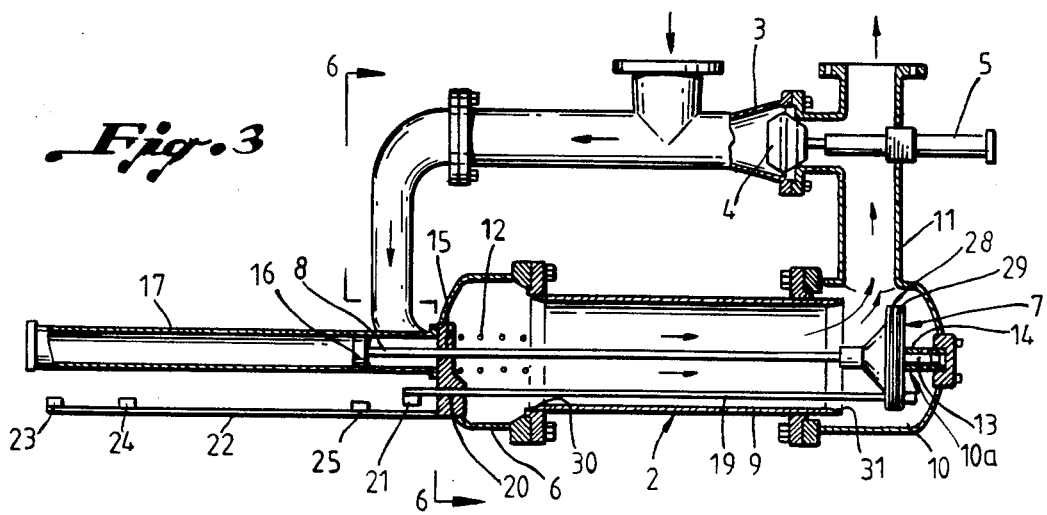
FIG. 3 is a side sectional view of the compact flow prover at the end of the proving cycle.

The proving cycle is commenced by allowing hydraulic fluid to drain from hydraulic cylinder 17 to the reservoir 44 as discussed below. Displacer 7 is encouraged to enter main cylinder 9 by compression spring 12, and the flow of fluid through inlet section 6. As displacer 7 enters main cylinder 9, fluid is displaced from main cylinder 9 into downstream section 10 and out of housing 2 through outlet conduit 11 as shown in FIG. 2. Detectors 24 and 25 provide signals as detector flag 22 passes therethrough. The rate of flow is determined by measuring the time between signals. Eventually the displacer 7 comes to rest in downstream section 10 after the proving cycle is completed, as shown in FIG. 3.

Displacer 7 is returned to the launching position by temporarily opening bypass valve 4 and applying pressure to hydraulic cylinder 17. Fluid displaced by the movement of displacer 7 enters housing 2 through outlet conduit 11 and exits through inlet conduit 1 as shown in FIG. 4.

Positioning outlet conduit 11 on the side of downstream section 10 is advantageous for several reasons. As displacer 7 exists main cylinder 9, displacer pilot 13 engages sleeve bearing 14 to keep displacer 7 in axial alignment with main cylinder 9. Displacement of the fluid from downstream section 10 serves as a natural arresting mechanism to stop the movement of displacer 7, eliminating the need for any special arresting means. However, for high fluid velocities, it may be desirable to use a dashpot control at the point the hydraulic fluid exits hydraulic cylinder 17. Also, it is impossible for displacer 7 to block the flow of fluid from downstream section 10 after displacer 7 enters downstream section 10 since fluid exits therefrom in a radial direction. Another significant advantage is that suspended solids, such as sand or grit, which may be present in the fluid are less likely to adhere to displacer seals 28 and 29 because of the cleaning action by the flowing fluid.

Shaft 8 and journal bearing 15 function as a inlet guide means while displacer 7 is disposed within inlet section 6. It can be readily appreciated, however, that other guide means and other displacer return means are possible.

The bifurcated arrangement of the inlet conduit 1 allows fluid to be introduced into the inlet section 6 in a substantially longitudinal direction, reducing angular forces on one displacer 7 and this provides an additional basis for permitting shaft 8 to have a reduced diameter and weight. The reduced weight of shaft 8 results in lengthened seal life when the compact flow prover is operated in the horizontal position. The reduced diameter of shaft 8 results in a lower pressure drop across displacer 7 while it is disposed within main cylinder 9.

It is also desirable to have a minimal pressure drop in the fluid flowing past displacer 7 while it is disposed within either inlet section 6 or downstream section 10. The diameter of inlet section 6 and downstream section 10 may therefore be substantially larger than the diameter of displacer 7. The conical shape of displacer 7 aids in reducing the pressure drop by reducing turbulence in the fluid flowing past the displacer 7.

As displacer 7 enters main cylinder 9, displacer seals 28 and 29 are compressed as they contact chamfers 30 or 31. This circumferential compression of displacer seals 28 and 29 causes the pressure to increase in annular space 32, resulting in a seal which does not require conventional external block and bleed pressuring. Another significant advantage is that there is only a low pressure drop across displacer 7 as it moves through main cylinder 9 because the seals cause only minimal friction as they slide against the interior surface of main cylinder 9.

Depending on the type of fluid whose flow is to be measured, the compact flow prover may be operated in either a horizontal or a vertical orientation. FIG. 10 shows displacer seals which are suitable for use in a compact flow prover operated horizontally. As displacer 7 slides through main cylinder 9, gravitational forces acting on the weight of displacer 7 will tend to pull it toward the bottom of main cylinder 9. If the seals could not support the weight of the displacer, metal to metal contact would occur with the disastrous consequences of damaging the finish of main cylinder 9. Thus, seals 28 and 29 are provided with a base portion 34a which extends beyond rings 36. To extend the long life of seals 28 and 29, they may be made from a relatively rigid seal material, such as polytetrafluoroethylene. The use of a relatively rigid seal material allows the seals to be used with a fluid having a low lubricity. On the other hand, the use of a more rigid seal material is not recommended for use with fluids having a high content of suspended solids as particulate matter will be more likely to remain embedded in the seals.

For operation of the compact flow prover in the vertical position, seals 28' and 29' shown in FIG. 11 are suitable. Since seals 28' and 29' do not have to support the weight of displacer 7, only lips 74' need to contact the interior surface of main cylinder 9. Seals 28' and 29' may be made of a relatively resilient material such as VITON. Solids entrained in the fluid measured are less likely to remain embedded in seals 28' and 29' and are more likely to be removed by the flow of fluid past the seals while displacer 7 is disposed within either inlet section 6 or downstream section 10. Hence, seals 28' and 29' are suitable for use with a dirty fluid such as crude oil. However, the softer seal material may develop high friction to develop when used with fluids having low lubricity.

The integrity of displacer seals 28 and 29 is verified by monitoring the pressure in annular space 32. If there is no decrease in pressure as displacer 7 moves from one end of main cylinder 9 to the other, the dynamic integrity of displacer seals 28 and 29 is verified. A pressure element, such as a transducer, can be located internally sending a signal electronically through wiring in either detector rod 19 or displacer shaft 18. The annular space 32 may be maintained in fluid communication with an externally located pressure element or transducer 82 by means of channel 58 connecting annular space 32 with conduit 59 formed in detector rod 19. The seal monitoring means may also comprise those disclosed in copending application, filed simultaneously herewith and having common assignee, entitled "Flow Prover with Seal Monitor," inventors Helmut W. Hopfe and Hershel Roberson, which is hereby expressly incorporated by reference.

The static method of determining seal integrity involves positioning displacer 7 within main cylinder 9 with bypass valve 4 in the open position. The pressure in annular space 32 may thus be observed for a longer period of time using the static method. This method may be preferred at times since minimum duration of the proving cycle can be as low as ½ second or less.

Figure 12:
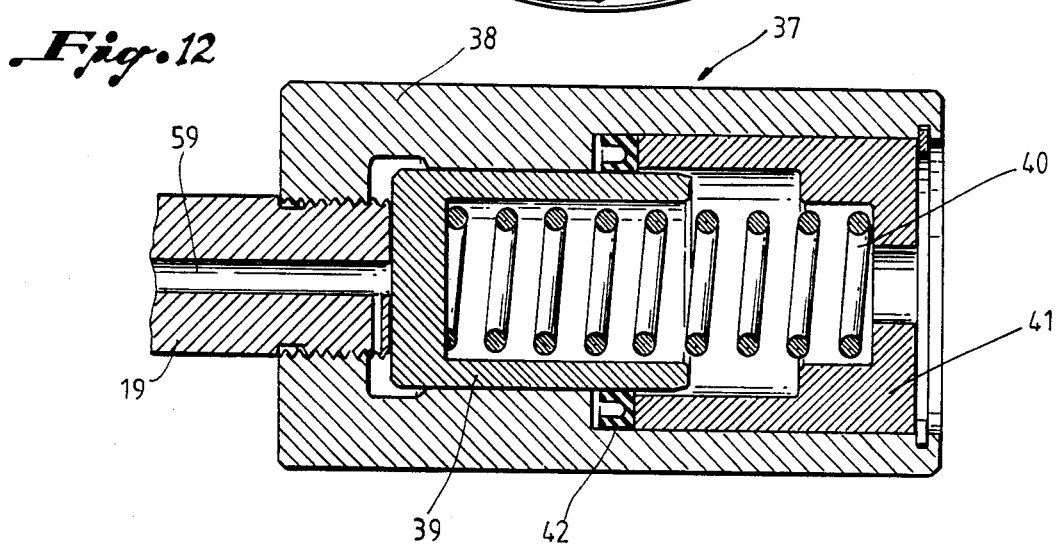
FIG. 12 is a greatly enlarged side sectional view of the volume compensator.

In larger embodiments of the invention which are used for higher flow rates, the diameter of main cylinder 9 and displacer 7 may be substantial. The volume of fluid compressed in annular space 32 may be therefore quite large, exceeding several cubic centimeters or more. Hence, the pressure in annular space 32 could become excessive. For this situation, a volume compensator 37 as shown in FIG. 12 may be provided to allow for expansion of the fluid volume. As the fluid in annular space 32 is compressed, inner element 39 compresses spring 40 against outer element 41. Fluid between inner element 37 and outer element 41 is expelled from volume compensator 37 while seal 42 forms a fluid barrier which prevents the fluid compressed in annular space 32 from escaping into main cylinder 9.

In the launch and proving modes, displacer release solenoid 45 shown in FIG. 13 is opened and hydraulic fluid allowed to drain into reservoir 44 as it is displaced from hydraulic cylinder 17 by hydraulic piston 16. Displacer 7 is returned to its launch position by closing displacer release solenoid 45, opening displacer return solenoid 46 and filling hydraulic cylinder 17 with fluid from reservoir 44 by hydraulic pump 43.

Hydraulic pump 43 is driven by motor 47. The rate of hydraulic fluid pumped is determined by lift selector valve 48 which operates the lift actuators 49 which are adapted to control the orientation of the prover. The hydraulic system is preferably used to also control bypass valve 4 by means of bypass close solenoid 50, bypass open solenoid 51 and bypass valve actuator 6.

The control box 53 shown in FIG. 14 may allow certain permissive actions. Thus, displacer 7 can be prevented from being launched unless a signal from bypass valve 4 indicates it is closed and a signal from bypass valve seal monitor 54 indicates that the pressure in annular space 55 is higher than line pressure. An indication from detector 23 that displacer 7 is in the inlet section 6 may also be required before closing bypass valve 4.

As displacer 7 travels through main cylinder 9, detector flag 21 passes through detector 24 which provides a signal to prover controller 56. Upon receiving this signal, prover controller 56 internally generates a series of high frequency digital pulses which are counted until detector flag 21 passes through detector 25. For even greater accuracy, the prover controller determines fractional pulses using the dual chronometry method which is well recognized in the industry, although other well known methods, such as the four counter method or the phase lock loop method, work equally well.

The volume of fluid displaced is determined from the distance between detectors 24 and 25 and the diameter of main cylinder 9, corrected for pressure and temperature expansion. The detectors 23, 24, 25, are mounted on a shaft 22 that may be made of a material with a low thermal expansion coefficient, such as Invar, so that no temperature or pressure correction is required for the distance between detectors 24 and 25, the measured length. From the elapsed time and the volume so determined, the flow rate can be calculated. The flow rate is then compared with the output generated by continuous flow meter 57.

Seal monitoring means for displacer 7, hydraulic shaft 8 and detector rod 19 provide a signal verifying seal integrity or indicating possible error in the measurement caused by the escape of fluid past any of these seals. If desired, prover controller 56 may be equipped with printer 58 to provide a hard copy of data and calculations.

Figure 15:
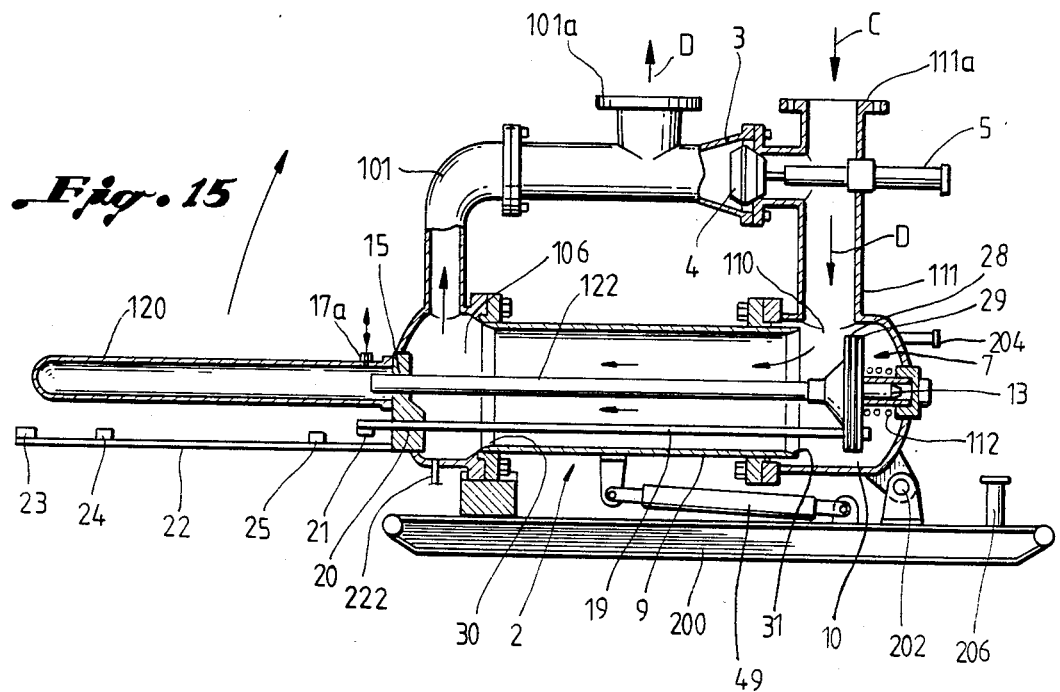
FIG. 15 is a side sectional view of another embodiment of the compact flow prover in the launch position.

As shown in FIG. 15, the compact flow prover of the present invention may be adapted for operation with relatively high as well as lower fluid pressures by reversing the direction of fluid flow through the prover and by replacing the inlet conduit 1 with an outlet conduit 101 which extends radially from the downstream section 106. Thus, the fluid is inletted to the housing 2 radially rather than longitudinally. The spring 12, used to arrest the movement of the displacer 7 in the embodiment of FIGS. 1 to 4, may be removed and a coiled spring 112 may be positioned concentrically about the sleeve bearing 14.

As also indicated in FIG. 15, the cylinder 17 and shaft 8 may be replaced with the pressure vessel 120 and ram 122. By controlling the pressure in the vessel 120 by supplying or exhausting fluid through the port 17a, the position of the displacer 7 may be regulated.

The flow prover may be mounted for pivotal movement on a rack 200 by way of a hinge 202. When the lift actuators 49 are operated, the flow prover rotates about the hinge 202 from a horizontal to a vertical orientation with the bottom 204 resting on the stop 206. The prover can thereafter be returned, as desired, to a horizontal configuration.

The embodiment shown in FIG. 15 may be operated by inletting fluid through the port 111a to the inlet conduit 111 as indicated by the arrow C and exhausting fluid through the port 101a, as indicated by the arrow D. With this arrangement, the displacer 7 is encouraged to enter the main cylinder 9 at the inception of the proving cycle not only by the compression spring 112 and the inlet fluid flow through the inlet section 110, but also by the differential pressure forces acting on the displacer 7.

More specifically, the effective surface area of the displacer 7 on its downstream face is less than that on its upstream face because of pressure shielded areas created by cross-sections of the ram 122 and rod 19 that extend through the housing 2. The imposition of the rod 19 and ram 122 decrease the total force acting on the downstream displacer 7 face below that acting on the larger effective surface area of the upstream displacer 7 face. When the fluid pressure is high, this may be a significant factor in urging the displacer into the cylinder 9.

Upon return of the displacer 7 from the downstream section 106 to the inlet section 110, displacer pilot 13 engages axial sleeve bearing 14. Displacer pilot 13 and sleeve bearing 14 function as inlet guide 110a to maintain displacer 7 in axial alignment with main cylinder 9. The inlet guide 110a allow smooth exit and entry of the displacer 7 between the section 110 and main cylinder 9. The spring 112 is useful, particularly in lower pressure applications, in conveying the displacer 7 into the cylinder 9. Similarly the journal bearing 15 interacts with the ram 122 and rod 19 to provide a downstream guide.

Figure 16:
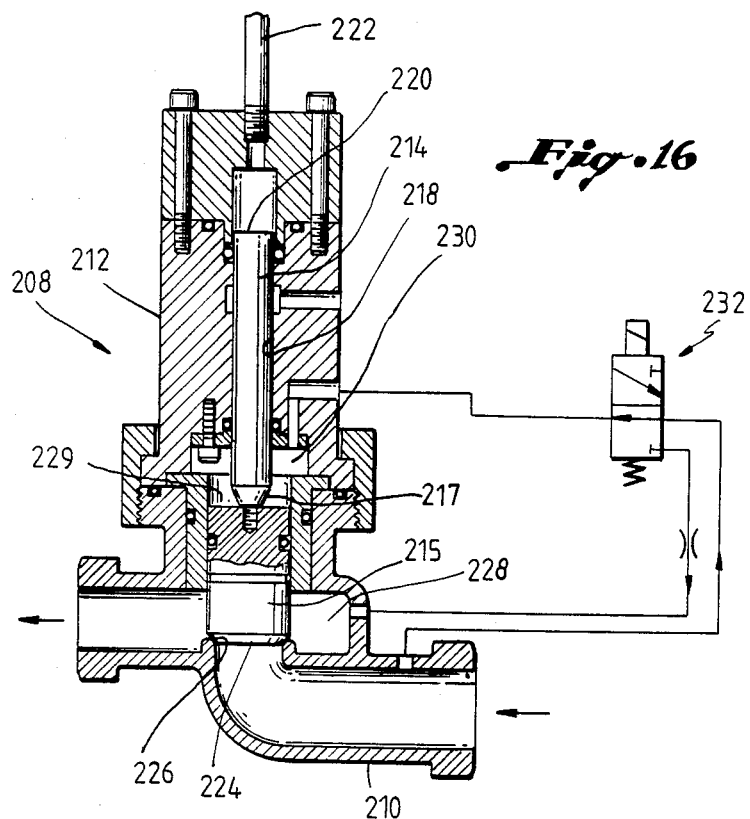
FIG. 16 is an enlarged cross-sectional view of a valve useful in conjunction with the embodiment shown in FIG. 15.

For operation at extremely high pressures, it may be desirable to balance the differential pressure forces acting on the displacer 7 during the proving cycle by restricting the draining of the hydraulic fluid from the vessel 120 to the solenoid 45. As shown in FIG. 16, a valve 208 may be mounted on the rack 200 and connected via a fluid line 210 to the port 17a. The valve 208 includes a tubular housing 212 that journals a sliding pin 214 on one end and a sliding piston 215 on the other end. The pin 214 slides freely within the bore 218 such that its pointed end 217 may abut with the piston 215. On its upper end 220 the pin 214 communicates with the downstream section 106 through the fluid line 222. The piston 215 includes an annular sealing surface 224 that may be pressed aganist a seat 226 in the line 210. The surface 224 and piston 215 are surrounded by an annular chamber 228 that connects to the reservoir 44 via line 45a. The upper end 228 of the piston 215 communicates with an enlarged fluid chamber 230.

Fluid may be selectively ducted from the line 210 to the chamber 230 or from the chamber 230 to the annular chamber 228 by the solenoid 232, under the control of the controller 56. Ducting line fluid to the housing 212 causes the piston 215 to seal the line 210 closed at the seat 226. Ducting the fluid from the housing 212 to the chamber 228 permits the fluid flow from the line past the piston 215 to be controlld by pressure in the downstream section 106.

In this way the exhaust of fluid from the vessel 120 may be blocked, to maintain fluid pressure or a controlled leakage of fluid may be permitted as necessary to compensate for any unbalanced pressure forces on the displacer 7 during the proving cycle. These unbalanced forces, which are a function of line pressure, arise from the different surface areas on the downstream and upstream faces of the displacer 7 due the positioning of the ram 122 and rod 19.

This compensation may be accomplished automatically by sizing the pin 214 and piston 215 to model the relationship between the combined cross-sectional areas displaced on the downstream side of the piston and the area of the end face of the ram 122 or the area of the piston 16 face, when the piston 16 is used. Thus by sizing the components to have the following relationship; compensation may be implemented automatically:

$$A1/A2 = A3/A4$$

Where:
"A1" is the cross-sectional area of the piston 215;
"A2" is the cross-sectinal area of the pin 214;
"A3" is the combined area displaced on the downstream side of the displacer 7, and in the illustrated embodiment this is equal to the cross-sectional area of the ram 122 (or of the piston shaft 8 in the embodiment of FIG. 1) plus the cross-sectional area of the rod 19; and
"A4" is the cross-sectional area of the end of the ram 122, or if a piston 16 is used, A4 is the area of the piston 16 face.

When the valve 208 is arranged in accordance with this relationship any line pressure in the prover is automatically accommodated. More importantly, this accommodation may be accomplished essentially instantaneously. In view of the fact that a proving cycle may last on the order of less than a second, prompt accommodation for the unbalanced pressure forces is essential.

The operation of the embodiment shown in FIG. 15 in its proving cycle is otherwise generally as described previously with respect to the embodiment of FIGS. 1-4.

While I have described above the specific implementations of my invention, many other variations will occur to those skilled in the art. It is intended that all such variations which fall within the scope of the appended claims be embraced thereby.

What is claimed is:
1. A compact flow prover, comprising:
 (a) fluid inlet conduit;
 (b) a housing comprising:
  (i) a main cylinder having a substantially uniform inside diameter;
  (ii) an inlet section having an inside diameter greater than the inside diameter of said main cylinder, said inlet section being in fluid communication with said inlet conduit and said inlet end of said main cylinder; and
  (iii) a downstream section having an inside diameter greater than the inside diameter of said main cylinder, said downstream section being in fluid communication with the downstream end of said main cylinder;
 (c) an outlet conduit being in fluid communication with said downstream section;
 (d) a displacer movably disposed within said housing, said displacer having an upstream face, a downstream face, and displacer seal means for forming a fluid barrier between said inlet and said downstream ends while said displacer is disposed within said main cylinder;
 (e) means for detecting the longitudinal disposition of said displacer in said housing at predetermined positions;
 (f) means for returning said displacer from said downstream section to said inlet section;
 (g) a bypass conduit being in fluid communication with said inlet conduit and said outlet conduit;
 (h) a valve positioned in said bypass conduit which can be opened for placing said prover in a displacer return mode or closed for placing said prover in a proving mode;
 (i) displacer launch means for encouraging said displacer to enter said main cylinder from said inlet section while a fluid is flowing therethrough, said launch means including means for creating a higher pressure force on said upstream face of said displacer than on said downstream face, said creating means including a shaft axially connected to the downstream face of said displacer, said shaft being of sufficient length to extend beyond said downstream section while said displacer is disposed within said inlet section; and
 (j) inlet guide means for maintaining the axial alignment of said displacer while said displacer is disposed within said inlet section, said inlet guide means comprising:
  (i) a displacer pilot axially extending from the upstream face of said displacer; and
  (ii) an axial sleeve located in said inlet section, said sleeve axially aligned with said displacer pilot.

2. A compact flow prover according to claim 1 wherein said means for returning said displacer from said downstream section to said inlet section comprises:
 (a) an enclosure axially aligned with said shaft having a substantially uniform inside diameter;
 (b) a reciprocating member axially connected to said shaft, said member movably disposed within said enclosure; and
 (c) a hydraulic source for causing said member to return by pressuring said enclosure with said source.

3. A compact flow prover according to claim 2, including a second shaft extending axially through said cylinder, said second shaft including means for measuring the position of said displacer.

4. A compact flow prover according to claim 1 including means, mounted on said shaft, for measuring the position of said displacer.

5. A compact flow prover according to claim 4 including means within said shaft for permitting the integrity of said displacer seal means to be monitored.

6. A compact flow prover according to claim 2 including means for compensating for the higher force on the downstream face during the proving cycle.

7. A compact flow prover according to claim 6 wherein said compensating means includes a valve arranged to selectively either block the fluid in said hydraulic cylinder or regulate the flow of fluid from said hydraulic cylinder.

8. A compact flow prover according to claim 1 wherein said prover is mounted for pivotal movement between a horizontal and a vertical orientation.

9. A flow prover comprising:
a cylinder having a substantially uniform inside diameter and a fluid inlet and a fluid outlet;
a piston movable through said cylinder as a fluid barrier;
means for detecting the displacement of said piston along said cylinder;
a fluid actuator including an enclosure and a member having a free end reciprocatable within said enclosure, said member being connected on its other end to said piston;
a fluid source for conveying fluid to and from the interior of said enclosure; and
a valve for controlling the flow of fluid from said enclosure, said valve including a valve piston disposed to control the flow of fluid from said enclosure and a pin arranged to engage said valve piston on one end, the other end of said pin being in fluid communication with the interior of said cylinder, said valve piston and pin being sized to control the rate of fluid flow from said enclosure to a rate which creates a force on said member which substantially equalizes the forces on both sides of said piston.

10. The prover of claim 9 wherein the ratio of the cross-sectional area of said valve piston to the cross-sectional area of said pin substantially equals the ratio of the cross-sectional area of said member plus the cross-sectional area of any other element connected to said piston and extending through said cylinder parallel to said member, to the cross-sectional area of the free end of said member.

11. A flow prover comprising:
a housing including a main cylinder having a fluid inlet and a fluid outlet;
an inlet section having an inside diameter greater than the inside diameter of said main cylinder, said inlet section being in fluid communication with said fluid inlet;
a piston movable through said cylinder as a fluid barrier; and
an inlet guide means for maintaining the axial alignment of said piston while said piston is disposed within said inlet section, said inlet guide means including a piston pilot, terminating in a free end contained within said housing and axially extending from the upstream face of said piston, and an axial sleeve located in said inlet section, said sleeve axially aligned with said piston pilot, such that said pilot may telescope within said sleeve.

12. The flow prover of claim 11 wherein said fluid inlet allows fluid to enter transversely to the length of said main cylinder.

13. A compact flow prover comprising:
(a) a fluid inlet conduit;
(b) a housing comprising:
 (i) a main cylinder having a substantially uniform inside diameter;
 (ii) an inlet section having an inside diameter greater than the inside diameter of said main cylinder, said inlet section being in fluid communication with said inlet conduit and said inlet end of said main cylinder; and
 (iii) a downstream section having an inside diameter greater than the inside diameter of said main cylinder, said downstream section being in fluid communication with the downstream end of said main cylinder;
(c) an outlet conduit being in fluid communication with said downstream section;
(d) a displacer movably disposed within said housing, said displacer having an upstream face, a downstream face, and displacer seal means for forming a fluid barrier between said inlet and downstream ends while said displacer is disposed within said main cylinder;
(e) means for detecting the longitudinal disposition of said displacer in said housing at predetermined positions;
(f) means for returning said displacer from said downstream section to said inlet section, said returning means comprising:
 (i) an enclosure axially aligned with said shaft having a substantially uniform inside diameter;
 (ii) a reciprocating member axially connected to said shaft, said member movably disposed within said enclosure; and
 (iii) a hydraulic source for causing said member to return by pressurizing said enclosure with said source;
(g) a bypass conduit being in fluid communication with said inlet conduit and said outlet conduit;
(h) a valve positioned in said bypass conduit which can be opened for placing said prover in a displacer return mode or closed for placing said prover in a proving mode;
(i) displacer launch means for encouraging said displacer to enter said main cylinder from said inlet section while a fluid is flowing therethrough, said launch means including means for creating a higher pressure force on said upstream face of said displacer than on said downstream face, said creating means including a shaft axially connected to the downstream face of said displacer, said shaft being of sufficient length to extend beyond said downstream section while said displacer is disposed within said inlet section; and
(j) a second shaft extending axially through said cylinder, said second shaft including means for measuring the position of said displacer.

14. A compact flow prover comprising:
a housing including a main cylinder having a fluid inlet and a fluid outlet;
a piston movable through said cylinder as a fluid barrier;
a fluid actuator including an enclosure and a member having a free end reciprocatable within said enclosure, said member connected to said piston by a first, axially extending shaft; and
means for detecting the displacement of said piston along said cylinder, said means including a second shaft extending axially through said cylinder, said second shaft including means for enabling the position of said piston to be measured.

15. The flow prover of claim 14 wherein said second shaft is adapted to telescope externally of said housing, said detecting means including a detector, mounted externally of said housing, adapted to detect the position of the portion of said second shaft extending externally of said housing.

16. The flow prover of claim 14 wherein said piston includes a seal means for forming a fluid barrier within said cylinder, said second shaft including means for monitoring the integrity of said seal means.

17. The flow prover of claim 14 including a piston launcher including means for creating a higher pressure force on the upstream face of the piston than on the downstream face, said creating means including said first and second shafts.

18. A compact flow prover comprising:
(a) a fluid inlet conduit;
(b) a housing comprising:
  (i) a main cylinder having a substantially uniform inside diameter;
  (ii) an inlet section having an inside diameter greater than the inside diameter of said main cylinder, said inlet section being in fluid communication with said inlet conduit and said inlet end of said main cylinder; and
  (iii) a downstream section having an inside diameter greater than the inside diameter of said main cylinder, said downstream section being in fluid communication with the downstream end of said main cylinder;
(c) an outlet conduit being in fluid communication with said downstream section;
(d) a displacer movably disposed within said housing, said displacer having an upstream face, a downstream face, and displacer seal means for forming a fluid barrier between said inlet and said downstream ends while said displacer is disposed within said main cylinder;
(e) means for detecting the longitudinal disposition of said displacer in said housing at predetermined positions;
(f) means for returning said displacer from said downstream section to said inlet section;
(g) a bypass conduit being in fluid communication with said inlet conduit and said outlet conduit;
(h) a valve positioned in said bypass conduit which can be opened for placing said prover in a displacer return mode or closed for placing said prover in a proving mode;
(i) displacer launch means for encouraging said displacer to enter said main cylinder from said inlet section while the fluid is flowing therethrough, said launch means including means for creating a higher pressure force on said upstream face of said displacer than on said downstream face, said creating means including a shaft axially connected to the downstream face of said displacer, said shaft being of sufficient length to extend beyond said downstream section while said displacer is disposed within said inlet section; and
(j) means, mounted on said shaft, for measuring the position of said displacer, and means within said shaft for permitting the integrity of said displacer seal means to be monitored.

19. A compact flow prover comprising:
a housing including a main cylinder having a fluid inlet and a fluid outlet;
a piston movable through said cylinder, said piston including seal means for forming a fluid barrier within said cylinder;
a fluid actuator including an enclosure and a member having a free end reciprocatable within said enclosure, said member connected by a first axially extending shaft to said piston;
a second shaft, connected to said piston and extending parallel to said first shaft, said second shaft adapted to telescope externally of said housing;
a detector, located externally of said housing, adapted to detect the position of said second shaft; and
means within said second shaft for enabling the integrity of said piston seal means to be monitored.

20. The flow prover of claim 19 wherein said second shaft is connected to said piston at a point spaced radially outwardly with respect to said first shaft.

21. The flow prover of claim 19 wherein said detector includes a third shaft arranged adjacent and parallel to said second shaft, said third shaft including at least one sensor adapted to sense the position of said second shaft.

22. The flow prover of claim 19 wherein said seal means includes a pair of parallel seals circumferentially surrounding said piston and defining a sensing space between said seals, said second shaft being in fluid communication with said space.

23. The flow prover of claim 22 wherein said first and second shafts extend from said downstream face of said displacer so as to create a pressure differential across said piston that encourages said piston to enter said cylinder.

24. A flow prover comprising:
a cylinder having a substantially uniform inside diameter and a fluid inlet and a fluid outlet;
a piston movable through said cylinder as a fluid barrier;
means for detecting the displacement of said piston along said cylinder;
a fluid actuator including an enclosure and a member having a free end reciprocatable within said enclosure, said member being connected on its other end to said piston;
a fluid source for conveying fluid to and from the interior of said enclosure; and
a valve for controlling the flow of fluid from said enclosure, said valve including a first element disposed to control the flow of fluid from said enclosure and a second element, operatively connected to said first element, and arranged for fluid communication with the interior of said cylinder, said first element and said second element being sized to control the rate of fluid flow from said enclosure to a rate which creates a force on said member which substantially equalizes the force on both sides of said piston.

25. The prover of claim 24 wherein the ratio of the cross-sectional area of said first element to the cross-sectional area of said second element substantially equals the ratio of the cross-sectional area of said member plus the cross-sectional area of any other element connected to said piston and extending through said cylinder parallel to said member, to the cross-sectional area of the free end of said member.

26. A flow prover adapted to handle very dirty fluids such as crude oil, said prover comprising:
a housing including a vertically aligned main cylinder having an interior wall, a fluid inlet and a fluid outlet;
a piston movable through said main cylinder parallel to the force of gravity as a fluid barrier in sealing, sliding contact with said cylinder interior wall; and
means for detecting the displacement of said piston along said cylinder.

27. The flow prover of claim 26 wherein said housing is tiltable between a horizontal and a vertical orientation.

28. The flow prover of claim 27 including hydraulic means for displacing said housing from a horizontal to a vertical orientation.

* * * * *